US 6,587,437 B1

(12) United States Patent
Lee et al.

(10) Patent No.: US 6,587,437 B1
(45) Date of Patent: Jul. 1, 2003

(54) ER INFORMATION ACCELERATION IN ABR TRAFFIC

(75) Inventors: Denny L. S. Lee, Kanata (CA); Jason T. Sterne, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/321,192

(22) Filed: May 27, 1999

(30) Foreign Application Priority Data

May 28, 1998 (CA) .............................................. 2238795

(51) Int. Cl.[7] .............................................. H04L 12/28
(52) U.S. Cl. .................... 370/236.1; 370/235; 370/231; 370/236
(58) Field of Search ................................ 370/229, 230, 370/231, 232, 233, 234, 235, 249, 253, 377, 395, 397, 399, 409, 468, 465, 252, 236, 236.1, 236.2

(56) References Cited

U.S. PATENT DOCUMENTS

| 5,787,073 | A | * | 7/1998 | Ikeda ........................... 370/236 |
| 5,898,669 | A | * | 4/1999 | Shimony et al. ............. 370/232 |
| 5,946,297 | A | * | 8/1999 | Calvignac et al. .......... 370/230 |
| 6,061,330 | A | * | 5/2000 | Johansson ................... 370/229 |
| 6,094,418 | A | * | 7/2000 | Soumiya et al. ............. 370/231 |
| 6,324,165 | B1 | * | 11/2001 | Fan et al. ..................... 370/232 |
| 6,487,202 | B1 | * | 11/2002 | Klausmeier et al. ........ 370/233 |

FOREIGN PATENT DOCUMENTS

WO    WO95/30318    11/1995

OTHER PUBLICATIONS

Chiussi, F. M.; Xia, Y.; Kumar, V. P., "Backpressure in Shared–Memory–Based ATM Switches under Multiplexed Bursty Sources", I.E.E.E., 1996, pp. 830–843.

The ATM Forum Technical Committee, "Traffic Management Specification, Version 4.0", Document No. af–tm–0056.000, Apr., 1996.

The ATM Forum Technical Committee, "Addendum to Traffic Management V4.0 for ABR parameter negotiation", Document No. af–tm–077.000, Jan., 1997.

Choudhury, A. K.; Hahne, E. L., "Dynamic Queue Thresholds in a Shared Memory ATM Switch", I.E.E.E., 1996, pp. 679–687.

\* cited by examiner

*Primary Examiner*—Wellington Chin
*Assistant Examiner*—William Schultz
(74) *Attorney, Agent, or Firm*—Alfred A. Maccione; Blake, Cassels and Graydon LLP (57) ABSTRACT

A method and network element for feedback control for adjusting a rate of message transmission over a connection in a network is provided. The connection comprises a source and destination linked by forward and backward message paths. The source has instructions for setting a message transmission rate for the connection provided by feedback messages received, each containing an explicit rate of transmission. The method comprises steps: receiving feedback messages from the backward path; extracting an explicit rate being carried by each feedback message received; storing each feedback message received in a queue; retrieving a stored feedback message and, substantially when it is transmitted, marking it with an explicit rate determined from an extracted explicit rate pertaining to another message received more recently and a rate determined from a state of congestion of the network element; and externally transmitting the feedback message over the backward message path once so marked.

22 Claims, 6 Drawing Sheets

ER INFORMATION ACCELERATION IN ABR TRAFFIC

FIELD OF THE INVENTION

The present invention relates generally to the field of data communications networks and more particularly, to a method and apparatus for source to destination flow control by means of accelerated feedback of network congestion information.

BACKGROUND OF THE INVENTION

The emergence of the Asynchronous Transfer Mode (ATM) networking protocol is intended as a response to the demand for faster data communications and more sophisticated processing. The ATM protocol relates to a cell based switching and multiplexing technology that is designed to be a general purpose transfer mode for a wide range of traffic services. Communications networks now serve a range of new applications involving mixed media traffic comprising data, voice, still and moving images and video. The aim of the ATM networking protocol is to provide a more flexible facility for the transmission of such traffic and for the allocation of transmission bandwidth in order to efficiently utilize network resources.

The ATM networking protocol is advantageous in that it provides network administrators and end users with multiple classes of communications service. The ATM Forum Traffic Management Working Group has defined five service categories for cell transmission which are distinguished by parameter sets used to describe source behaviour and quality of service (QoS) guarantees. These service categories are identified as constant bit rate (CBR), real-time variable bit rate (rtVBR), non-real-time variable bit rate (nrtVBR), available bit rate (ABR) and unspecified bit rate (UBR), all of which are set out in the *Traffic Management Specification*, Version 4.0, which was published by the ATM Forum Technical Committee under document no. af-tm-0056.000 in April 1996. An addendum to this specification entitled "Addendum to Traffic Management V4.0 for ABR parameter negotiation" was published under document no. af-tm-077.000 in January 1997.

The ABR and UBR service categories are intended to carry data traffic which has no specific cell loss or delay guarantees. The UBR service category is the simplest of the two, as it optionally provides only a guaranteed minimum cell rate. The ABR service category provides source to destination flow control that attempts, but is not guaranteed, to achieve zero cell loss. Thus, the ABR service category offers users a relatively high quality of service in terms of cell loss probability and yet seeks to maintain high network resource utilization. Traffic management techniques such as those adopting flow control are used to protect a network and its various end-systems from congestion in order to achieve network performance and utilization objectives.

Flow control in the ABR service category is achieved by arranging for each source node of a network to send special resource management (RM) cells through the network. The RM cells are typically interleaved with data cells in the network. Each network entity or element, for instance a switch or node in the network, may indicate its congestion status by writing into the RM cell. The RM cell is then forwarded on to the next network element in the data path. At the destination network element, the RM cell is turned back towards the source. The network entities in the backward data path may mark congestion information into the RM cell, which is ultimately received by the source may then adjust its sending rate in response to the information contained in the received RM cell.

The RM cell typically contains three fields which may be written to in order to describe the congestion status of a network entity. First, the cell provides a "no increase" (NI) it which indicates that the source must not increase its sending rate. Second, there is provided a congestion indication (CI) bit which indicates that the source must decrease its sending rate. Third, the RM cell contains an explicit rate (ER) field which contains the minimum explicit rate of transmission as may be calculated by any network element in the data path. The concepts of an explicit rate and of algorithms for calculating explicit rates are described in greater detail below. The behaviour of a network source in response to the information contained in these three RM fields is well-known to those skilled in this art.

Various mechanisms can be used in order to achieve flow control in a network. These mechanisms can be classified broadly depending on the congestion monitoring criteria used and the feedback mechanism employed. The feedback mechanisms are either binary in nature or calculate an explicit rate of transmission. In each case flow control information is provided to the source through the RM cell, as explained in greater detail herebelow.

In one method of binary flow control, known to those skilled in this art as Binary ABR, a particular bit in each data cell is set during network congestion. The bit in question is an indicator of forward congestion and is hence known as an Explicit Forward Congestion Indicator bit, or EFCI bit. If a data cell arrives at the network destination node with its EFCI bit set, the node will set an internal variable, known as the CI_State, to a value of 1. Otherwise, the CI_State variable within the node is set to a value of 0. When a resource management cell arrives at the same destination node, and this particular node has its CI_State variable set to a value of 1, the node will set the previously mentioned CI bit in the RM cell also to a value of 1. The RM cell will make its way along the data path to the network source node and this source node will increase its rate of transmission if the CI bit of the arriving RM cell is set to 0, but will decrease its transmission rate if the CI bit of the RM cell is set to 1.

Those skilled in this art will readily appreciate that Binary ABR is a random method of exerting flow control, in that the mechanism cannot control which particular ABR connection will receive restrictive flow control information at any particular point in time. Flow control will therefore vary depending on the instantaneous traffic flow at each contention point in the network. Generally, it is thought that the Binary ABR mechanism is more susceptible to instability in larger networks. Binary feedback schemes where all the connections may share a common FIFO queue may sometimes suffer from unfairness problems depending on the network topology and the source and destination behaviour employed. Given the same level of congestion at all of the switches along a data path, connections travelling more hops have a higher probability of having their EFCI bits set than those travelling a smaller number of hops. Depending on the source and destination behaviour employed, these long hop connections get very few opportunities to increase their rates of transmission and consequently their throughputs are starved. This gives rise to what those in this art have called a "beat down" problem. Potential unfairness problems in binary feedback schemes where all of the virtual connections share a common queue can be alleviated in some cases. For instance, one known enhancement in this regard is to provide separate queues for each virtual connection or for groups of virtual connections.

In explicit rate feedback schemes, a network node such as a switch will perform three important functions. First, the switch will compute the fair share of the network bandwidth that can be supported for a virtual connection. Second, the switch will determine its load. By way of example, this can be done either by monitoring queue lengths or queue growth rates associated with buffering incoming cells. Third, an actual explicit rate of transmission for the connection will be determined by the switch and this information will be sent to the source. Examples of explicit rate switch mechanisms known to those skilled in this art are the Enhanced Proportional Rate Control Algorithm (EPRCA) and two congestion avoidance schemes, namely Explicit Rate Indication for Congestion Avoidance (ERICA) and Congestion Avoidance using Proportional Control (CAPC).

Various explicit rate algorithms have been developed in order to fairly distribute bandwidth between ABR connections. Typically, an explicit rate algorithm may be deployed at every contention point in the data path, namely at every queuing point in the network where the aggregate arrival rate of cells is greater than the aggregate service rate. In the context of an ABR controlled connection, the service rate pertains to the capacity available for the ABR connection, and this capacity is generally time dependent. The ER algorithm attempts to fairly distribute bandwidth between ABR connections at each contention point. For instance, in a Max-Min fairness class of ER algorithms, the goal is to allocate bandwidth at each link in the network so that the link is fully utilized while simultaneously achieving a fair distribution of bandwidth between connections. Each connection will therefore receive an end-to-end bandwidth allocation which is equal to its fair share at the contention point in its connection path through the network where resources are most scarce. A network entity such as a switch may have one or more contention points.

On the establishment of an ABR connection, the end system will specify to the network both a maximum useable bandwidth and a minimum required bandwidth. These are designated typically as the peak cell rate (PCR) and the minimum cell rate (MCR), respectively. ABR flow control occurs between a sending end system and a receiving end system. The sending end system and the receiving end system are connected via bidirectional connections. For each such bidirectional ABR connection, every connection termination point is both a source and a destination. For the forward flow of information from source to destination there exists a control loop consisting of two RM cell flows, one in the forward direction and one in the backward direction. The same holds true for the backward information flow from destination to source.

A network source will generate forward RM cells which are turned around by the destination and sent back to the source as backward RM cells. It is these backward RM cells which carry the feedback information provided by the network elements and/or the destination back to the source. Each network element may directly insert feedback control information into the RM cells when they pass in the forward or backward direction. As well, each network element may indirectly inform the source about congestion by setting the EFCI bit in the data cell header of the cells of the forward information flow. A network element in an impending congested state or in a currently congested state may set an EFCI bit in the cell header so that this indication may be examined by the destination end system. For example, the end system may use this indication to implement a protocol that adaptively lowers the cell rate of the connection during congestion or impending congestion. A network element that is not in a congested state or an impending congested state will not modify the value of this indication. An impending congested state is a state when a network element is operating around its engineered capacity level. Where a cell header contains a set EFCI it, the destination will update the backward RM cells based on this congestion information. As alternatives to inserting feedback control information into RM cells or to the setting of EFCI bits in data cells, each network element may itself generate backward RM cells for flow control.

Like any typical negative feedback control system, the delay in the feedback loop is very important in determining the performance of the controlled system. In the case of the ABR service category which uses explicit rate marking as discussed above, nodal congestion information is marked into the in-band backward RM cell if its value is less than what is being already carried inside cell. As such, the source will always receive the lowest explicit rate values as offered by the nodes that the connection traverses. Thus, the faster the backward RM cells travel back to the source, the quicker the source can respond and hence the better the performance of the feedback mechanism.

Various techniques have been used in the prior art in order to minimize the ER information feedback delay as a backward RM cell travels through a node. One technique involves segmenting an ABR loop by the creation of virtual sources and virtual destinations. This creates a concatenation of sequential virtual ABR control loops, wherein the feedback delay is reduced in each virtual loop. Another known method of reducing ER information feedback delay involves the provision of a dedicated queue for the backward RM cells.

Other techniques for improving ER information feedback involve addressing delays experienced by backward RM cells when such cells experience queuing at various nodes along a connection path. For instance, a network switch which deploys ER based flow control will usually have cell input and output buffers for incoming and outgoing data and RM cells. The backward RM cells in such a configuration may experience unacceptable delays as they are placed in the output queue of the switch, which will normally operate according to a first-in first-out (FIFO) retrieval. These delays are especially prevalent when many virtual connections may be multiplexed into the output queue. Since the ABR service category is often used for bandwidth-on-demand data traffic which seeks to use up all available bandwidth and buffers its network resources as much as possible, congestion of output queues is much more likely with such traffic. It has therefore been proposed in the prior art that backward RM cells be permitted to advance or skip ahead of data cells in the output queues of ATM switches as a means of reducing flow control feedback delay.

Typically, known mechanisms for backward RM cell acceleration have employed a separate queue for such cells, which may be complex or costly to implement, especially where a per-VC queuing structure is to be adopted. As backward RM cells skip ahead of data cells, the intercell spacing of the backward RM cells is no longer observed. This introduces the problem of cell clumping. Thus, one can experience a burst of backward RM cells at one time interval and yet for another interval there is no backward RM cell for carrying congestion information.

There is therefore a need to provide a method and apparatus for ER information acceleration that seeks to alleviate or overcome certain of the problems associated with prior art solutions.

SUMMARY OF THE INVENTION

According to a first broad aspect of the present invention, a method of feedback control for adjusting a rate of message transmission over a connection in a communications network is provided. The connection comprises a source and a destination of message transmission. A forward message path begins with the course and ends with the destination, and a backward message path begins with the destination and ends with the source to thereby form a closed loop for the feedback control. The communications network has network elements through which the forward and the backward message paths each traverse. The source is provided with instructions for setting a rate at which the source will transmit messages over the connection, the instructions being transported over the connection by feedback messages received by the source, each of the feedback messages so received containing an explicit rate of transmission each constituting a lowest of a plurality of explicit rates of transmission which correspond to those determined respectively from states of congestion associated with each of the network elements. The method of feedback control comprises the steps of: (a) receiving feedback messages from the backward message path at a network element traversed by the backward message path; (b) extracting an explicit rate of transmission being carried by each of the feedback messages received; (c) storing each of the feedback messages received in a first-in first-out order in a queue; (d) retrieving a feedback message from the head of the queue for transmission from the network element and, substantially at a time when the feedback message retrieved from the head of the queue is to be transmitted externally from the network element, marking the feedback message retrieved from the head of the queue with an explicit rate of transmission determined as a function of an extracted explicit rate pertaining to another feedback message of the feedback messages received more recently received than the feedback message retrieved from the head of the queue and a rate determined from a state of congestion associated with a contention point of the network element; and (e) externally transmitting the feedback message retrieved from the head of the queue from the network element over the backward message path once the feedback message retrieved from the head of the queue has been so marked.

According to a second broad aspect of the present invention, a network element for providing feedback control for adjusting a rate of message transmission over a connection in a communications network is provided. The connection comprises a source and a destination of message transmission. A forward message path of the connection begins with the source and ends with the destination and a backward message path of the connection begins with the destination and ends with the source to thereby form a closed loop for the feedback control. The communications network provides network elements through which the forward and the backward message paths each traverse. The source is provided with instructions for setting a rate at which the source will transmit messages over the connection, the instructions being transported over the connection by feedback messages received by the source, the feedback messages so received containing an explicit rate of transmission constituting a lowest of a plurality of explicit rates of transmission which correspond to those determined respectively from states of congestion associated with each of the network elements. The network element comprises: (a) an input pertaining to the backward message path, wherein the input receives feedback messages from the backward message path; (b) a first memory associated with the input of the backward message path storing the explicit rate of transmission extracted from each of the feedback messages received from the backward message path; (c) a second memory, wherein each of the feedback messages received from the backward message path is stored in said second memory in a first-in first-out order after the explicit rate of transmission is extracted therefrom; (d) an output module pertaining to the backward message path transmitting feedback messages retrieved from said second memory; and wherein a feedback message received is retrieved from the second memory in a first-in first-out order and is thereafter marked with an explicit rate of transmission determined as a function of the explicit rate stored in the first memory pertaining to another feedback message of the feedback messages received different from the feedback message retrieved and a rate determined from a state of congestion associated with a contention point of the network element, the feedback message retrieved being transmitted from the output once the feedback message for transmission has been so marked.

According to a third broad aspect of the present invention, a method of feedback control for adjusting a rate of message transmission over a connection in a communications network is provided. The connection comprises a source and a destination of message transmission. A forward message path begins with the source and ends with the destination and a backward message path begins with the destination and ends with the source to thereby from a closed loop for the feedback control. The communications network provides network elements through which the forward and the backward messages paths each traverse. The source is provided with instructions for setting a rate at which the source will transmit messages over the connection, the instructions being transported over the connection by feedback messages received by the source, the feedback messages so received each containing an explicit rate of transmission constituting a lowest of a plurality of explicit rates of transmission which correspond to those determined respectively from states of congestion associated with each of the network elements. The method of feedback control comprises the steps of (a) receiving a new feedback message from the backward message path at a network element trasversed by the backward message path; (b) extracting an explicit rate of transmission being carried by the new feedback message; (c) providing a feedback message for transmission from the network element at a time after steps (a) and (b) and prior to providing the new feedback message for transmission from the network element and marking the feedback message for transmission with an explicit rate of transmission determined as a function of the explicit rate extracted from the net feedback message and a rate determined from a state of congestion associated with a contention point of the network element substantially at a time when the feedback message for transmission is to be transmitted externally from the network element; and (d) immediately following the marking of the feedback message for transmission as aforesaid, transmitting the feedback message for transmission externally from the network element over the backward message path.

DETAILED DESCRIPTION OF THE PREFERRED EMBODIMENTS

Figure 1:
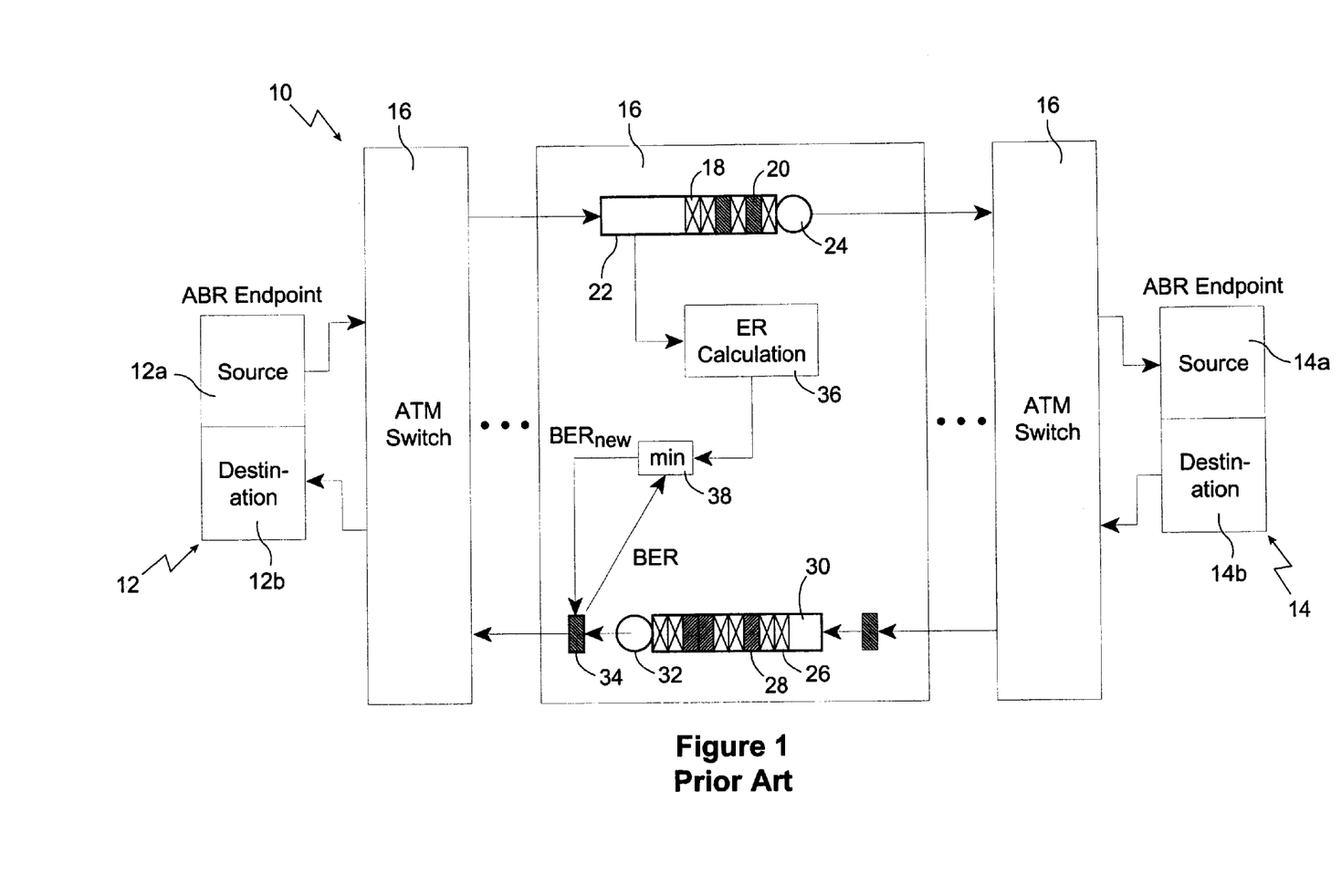
FIG. 1 is an example of a prior art ATM network segment having an ATM switch which does not deploy backward ER information acceleration.

With reference to FIG. 1, an ATM network segment 10 for an ABR connection, such as a virtual connection, has a first ABR endpoint 12 and a second ABR endpoint 14. Since ABR traffic operates in full-duplex fashion, each ABR endpoint for a given connection will act both as source endpoints 12a, 14a and as destination endpoints 12b, 14b. Traffic in each of the forward and backward directions within the network segment 10 will traverse various ATM switches 16.

In the forward traffic direction, arriving data cells 18 and forward RM cells 20 are received by the switches 16 in an ingress queue 22 thereof, which may operate according to first-in first-out (FIFO) retrieval. The received forward cells may be dequeued by means of a queue server 24 or the like. In the backward traffic direction, arriving data cells 26 and backward RM cells 28 are received in an egress queue 30 thereof, which likewise may operate according to FIFO retrieval. A queue server 32 may be employed to dequeue the arriving backward cells.

As each backward RM cell 34 exits the egress queue 30, its in-band ER information will be extracted and the in-band ER value compared to a local ER value that is derived or calculated, as at 36, according to any of the methods well known to those skilled in this art. If the local ER value is less than the in-band ER value, determined as at 38, the in-band ER value is replaced with the local ER value. Otherwise the in-band ER value is left undisturbed. This prior art method and apparatus for backward RM cell ER marking suffers from the problem that the in-band ER values of the RM cells 28 are subject to the delays experienced by the RM cells 28 as they wait to be serviced from the egress queue 30, as previously explained.

Figure 2:
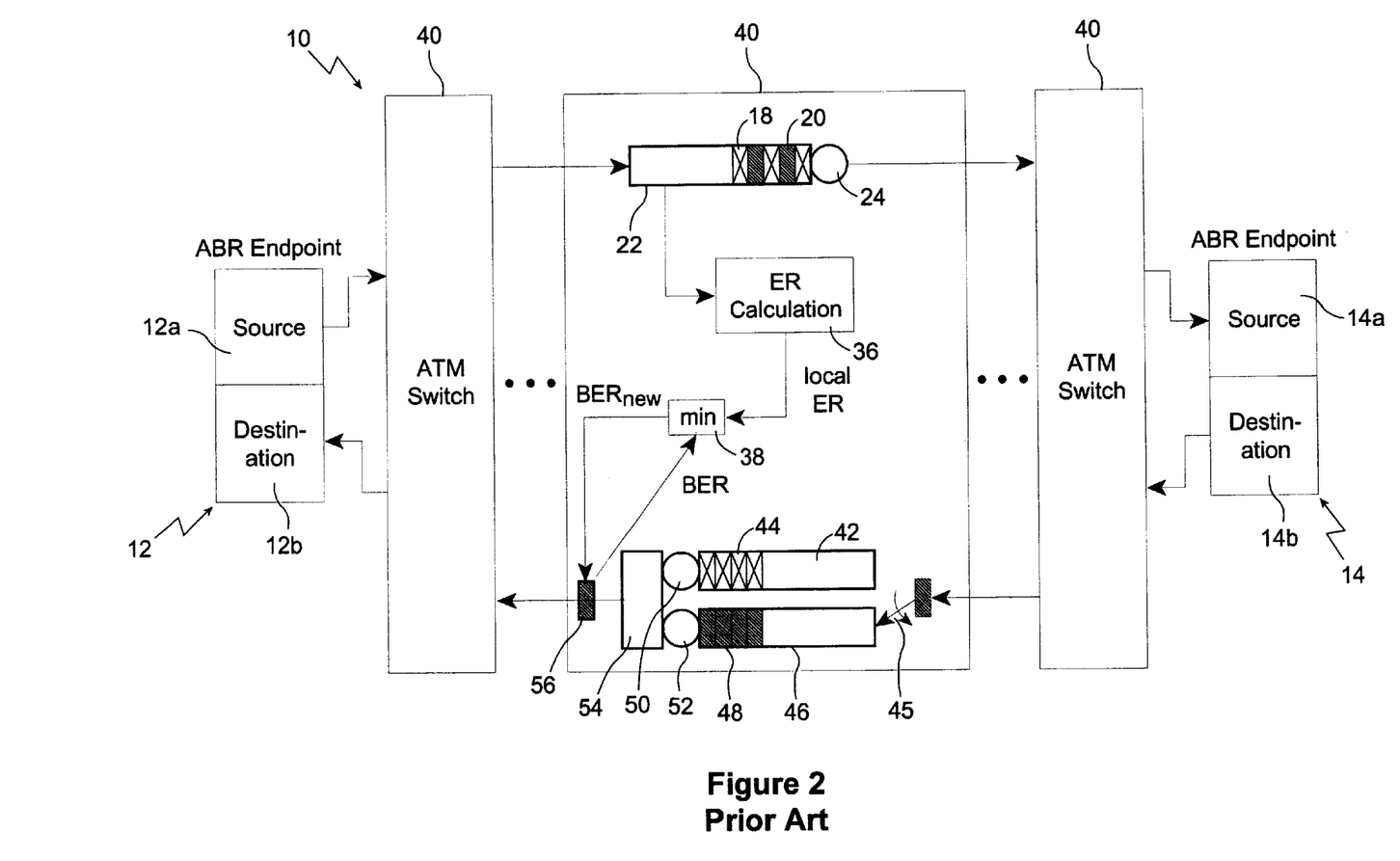
FIG. 2 is another example of a prior art ATM network segment having an ATM switch which achieves backward ER information acceleration by means of a separate output queue for backward RM cells.

Turning to FIG. 2, one of the prior art solutions for decreasing the delays encountered by backward RM cells in the egress queues of ATM switches is next described. Each ATM switch 40 may be provided with two egress queues per connection. The first egress queue 42 of the two queues is dedicated to data cells 44. The second egress queue 46 is dedicated to backward RM cells 48. A cell filter (not shown) operating as a 45 will read the ATM header of cells arriving at egress queues 42, 46 and will direct the cell to the appropriate queue based upon whether the cell is identified to be an RM cell or a data cell. Each of the egress queues 42, 46 are typically FIFO queues and are respectively serviced by queue servers 50, 52. A scheduler 54 is normally utilized to shape the transmission of data cells 44 and backward RM cells 48 which are served from the egress queues 42, 46.

The ER information marking scheme for exiting backward RM cells 56 is as was previously described with reference to the prior art exemplified by FIG. 1. As mentioned above, the prior art mechanism of utilizing multiple queues introduces the problem of backward RM cell clumping. As well, in a per-connection queuing structure, a separate set of queues would be required for each ABR connection traversing the switch. Where several thousand and connections are handled by the switch, implementation of separate queuing may be costly.

Figure 3:
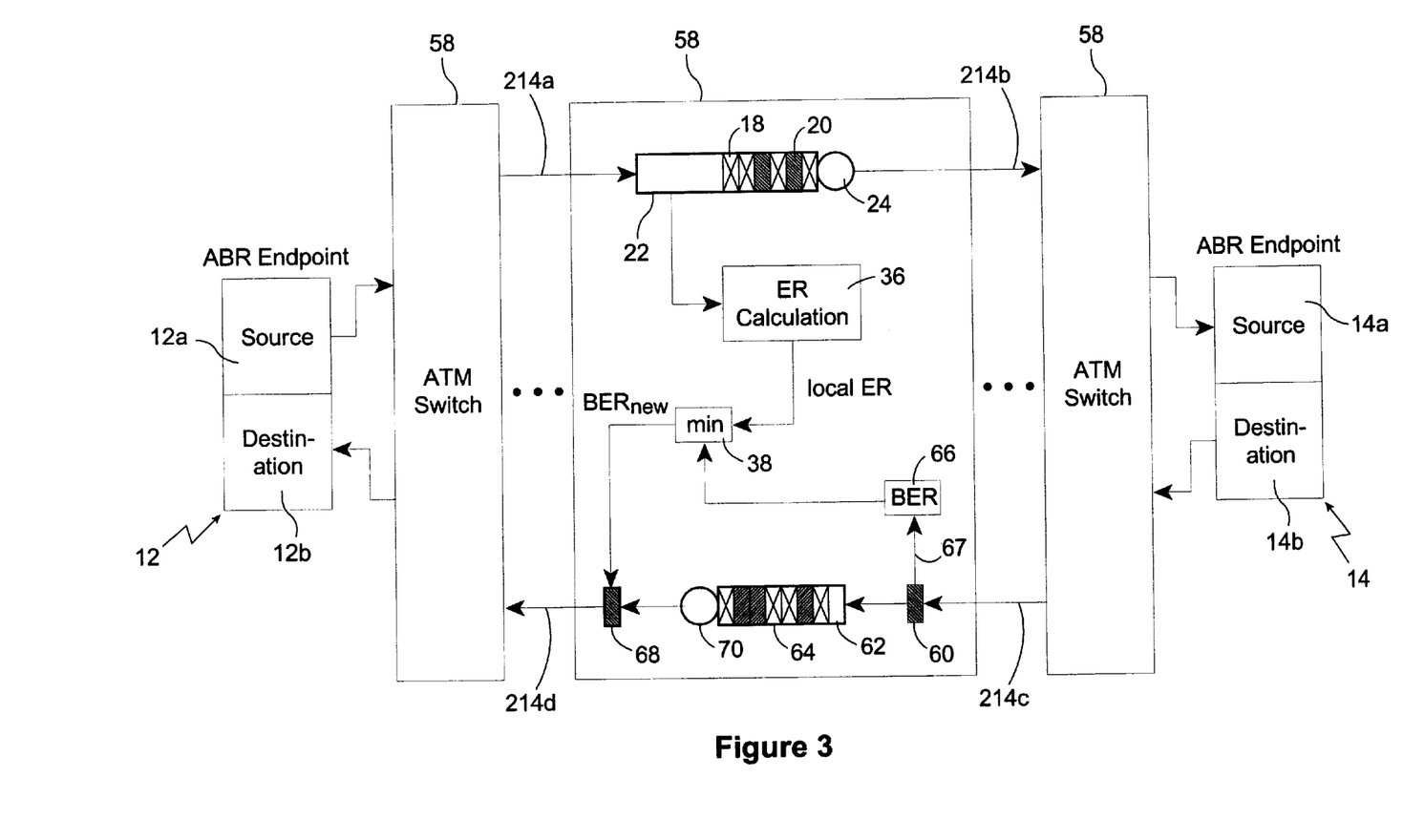
FIG. 3 is a schematic representation of an ATM network segment providing ATM switches which adopt the method and apparatus for information acceleration according to one embodiment of the present invention.

Referring to FIG. 3, in the preferred mechanism of backward RM cell acceleration according to the present invention, a network entity such as a switch 58 extracts the in-band ER information 67 from each backward RM cell 60 prior to the RM cell being placed into egress queue 62 of the switch 58. Egress queue 62 is preferably a FIFO queue, and one such queue is provided per ABR connection. The RM cells are preferably placed into the egress queue 62 along with arriving data cells 64, thereby preserving the intercell spacing of arriving backward RM cells. The in-band ER information 67 is preferably stored subsequent to its extraction, such as in a memory register 66 or the like. The extracted in-band ER information 67 is preferably stored such that the extracted rate pertaining to a previously received backward RM cell is replaced by that pertaining to a last received RM cell.

When a backward RM cell 68 is dispatched from egress queue 62 by the queue server 70, the value of the stored in-band ER information 67 is compared to an instantaneous local ER value derived or computed from one or more contention points within the switch 58. For instance, a single local ER value may be computed as at 36 in the manner previously described. If desired, more than one ER value pertaining to various contention points within a switch may be utilized to derive an instantaneous local ER value for comparison with the stored in-band ER information. By way of example, the instantaneous local ER value may be the result of a mathematical function, for instance an average, computed from selected ER values pertaining to a given set of contention points. A function of these two values, namely of the stored in-band information 67 and the instantaneous local ER value, is placed back into the exiting backward RM cell 68. As discussed above, preferably the function may be the minimum of these two values determined as at 38. The exiting cell 68 is then transmitted from the switch. The transmission of backward ER information may therefore experience acceleration in comparison to the prior art methods described above. Congestion information in the form of the lowest explicit rates of source transmission along a connection path are therefore egressed from a switch and back to the connection source in an accelerated manner, in that the in-band ER information from arriving backward RM cells is used in the marking of ER information for departing backward RM cells from the switch.

Figure 4:
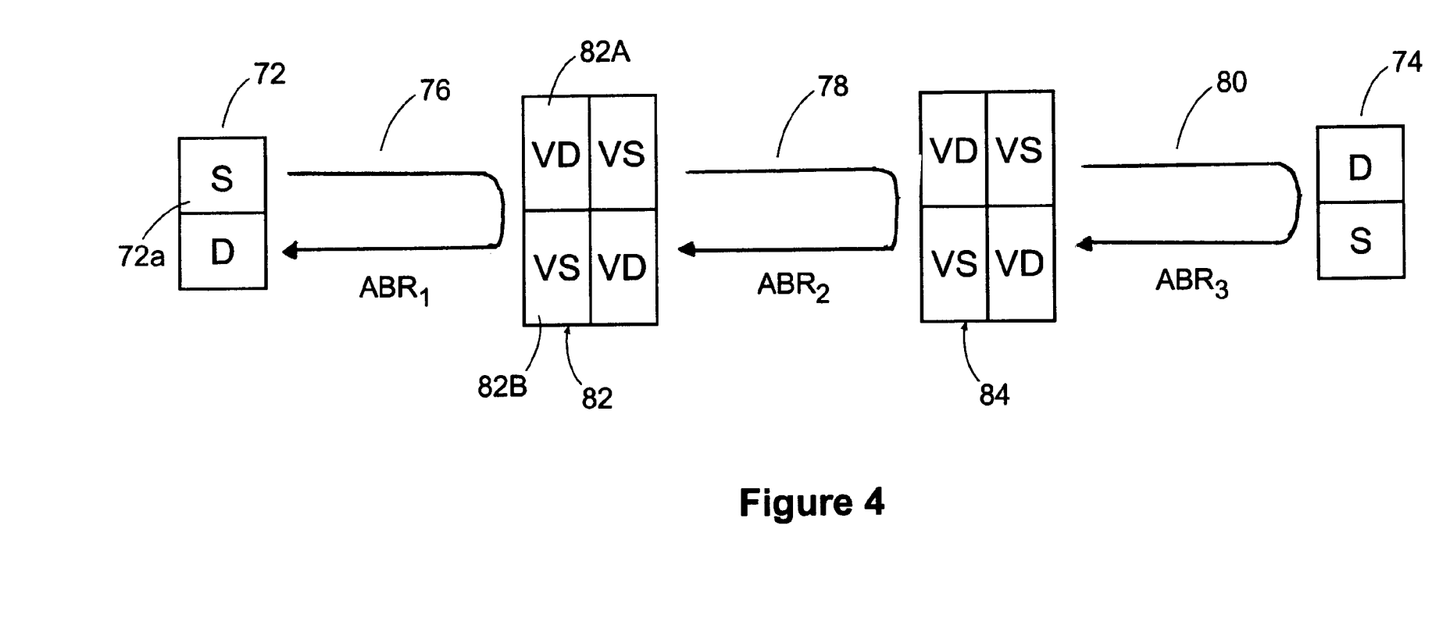
FIG. 4 is a schematic representation of an ABR connection which has been segmented into a plurality of virtual source/virtual destination ABR loops, within which a further embodiment of the present invention may be implemented.

Turning to FIG. 4, the present invention may be adapted to virtual source/virtual destination (VS/VD) ABR loop segmentation. As mentioned previously, ABR loop segmentation reduces feedback delay from the various network entities along a connection to the source. By reducing such feedback delay, it is expected that each segmented ABR loop is better controlled and that the reaction to congestion and available bandwidth can be expected to have a tendency to demonstrate a better response. Each ABR connection between two ABR end stations 72, 74 may be logically divided into serially connected ABR loops 76, 78, 80 respectively designated $ABR_1$, $ABR_2$ and $ABR_3$. These ABR loops are separated by VS/VD switches 82, 84, each of which acts as two ABR end stations, one for the preceding ABR loop and one for the succeeding ABR loop. For instance, VS/VD switch 82 provides a forward virtual destination 82a and a backward virtual source 82b for ABR$_1$ loop 76, and a forward virtual source 82c and backward virtual destination 82d for ABR$_2$ loop 78.

Where each ABR loop in an end-to-end ABR connection provides isolated feedback to its respective forward virtual source, the present invention may be implemented in the manner previously described at the backward virtual source associated with the particular ABR loop. For instance, in the case of ABR$_1$ loop 76, feedback control for forward source 72a may be provided by backward RM cells processed by way of the invention at backward virtual source 82b.

Where end-to-end Max-Min fairness in bandwidth distribution is desired between ABR connections, in that each connection is intended to receive an end-to-end bandwidth allocation which is equal to its fair share at the point in its path through the network where resources are most scarce, coupling between the various ABR loops at each VS/VD switch may be employed. The function of coupling is to allow the ABR loops to interact such that upstream loops can react to congestion experienced by downstream loops. This may reduce buffering requirements and allows the end-to-end ABR connection to converge to the bottleneck transmission rate as determined at contention points along its path.

If VS/VD coupling is desired in an end-to-end ABR connection, backward ER information from a downstream loop, such as ABR$_2$ loop 78, will be provided to the backward virtual source associated with the preceding upstream loop, such as 82b of VS/VD switch 82 for the ABR$_1$ loop 76. This information will be provided in addition to forward ER information pertaining to the upstream loop. When such coupling is employed at a VS/VD switch 86 (FIG. 5), the invention can be implemented as previously described, with the exception that the ER value placed into an exiting backward RM cell 92 will be a function of three values. Namely, these three values are the instantaneous local ER value, the ER value associated with incoming forward RM cells 88 received from the upstream ABR loop, and the ER value associated with incoming backward RM cells 90 received from the downstream ABR loop. Preferably, the marked ER value for the exiting RM cell 92 will be the minimum of these three values, as computed at 94.

Figure 5:
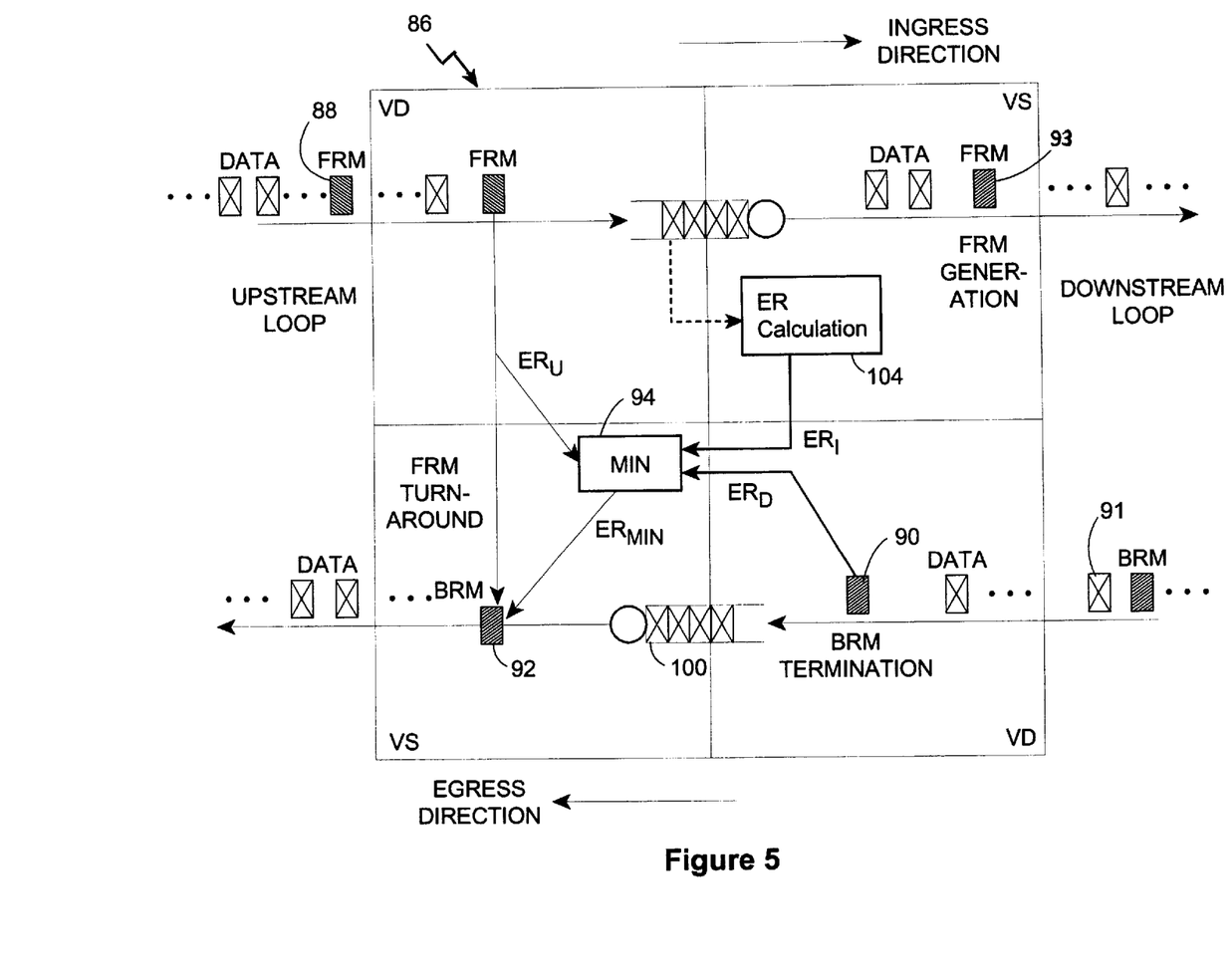
FIG. 5 is a flow diagram which illustrates the operation of the further embodiment of the present invention within a network entity such as an ATM switch.

According to another preferred embodiment of the present invention shown in a VS/VD switch 86 of FIG. 5, in-band ER information $ER_U$ from arriving upstream forward RM cells 88 and in-band ER information $ER_D$ from arriving downstream backward RM cells 90 may be extracted therefrom for use in deriving the minimum $ER_{MN}$ of the instantaneous ER value $ER_D$ the forward in-band ER information $ER_U$ and the backward ER information $ER_D$. In contrast to the preferred embodiment previously described, egress queue 100 is a queue that is dedicated to data cells 91 received from the backward direction of the downstream loop, since the backward RM cells 90 are terminated at the VD point of the downstream loop. Egress queue 100 may be a FIFO queue with one such queue preferably provided per ABR end-to-end connection.

When a backward RM cells 92 is dispatched in the backward direction of upstream loop from switch 86, the values of the in-band ER information $ER_U$ and $ER_D$ are compared to the instantaneous local ER value derived or computed as at 104 in the manner previously described. Preferably, the minimum of these three values as determined at 94 is placed back into the exiting RM cell 92. The exiting RM cell 92 is obtained by the turn-around of a forward RM cell 88 received in the forward direction of the upstream loop. In the forward downstream direction, forward RM cells 93 are generated at the VS point of the downstream loop. Those skilled in this art will appreciate that for sake of illustration, only a half duplex transmission of data and RM cells is shown in FIG. 5, and that typically data and RM cells will travel in each direction within the upstream and downstream VS/VD loops.

If desired, the in-band ER information extracted from each of the arriving upstream forward RM cells 88 and the arriving downstream backward RM cells 90 may be stored respectively in separate memory registers after extraction, as is the case for the in-band ER information 67 previously described in relation to another preferred embodiment of the present invention. The in-band ER information 67 is described above as being stored in a memory register 66.

Figure 6:
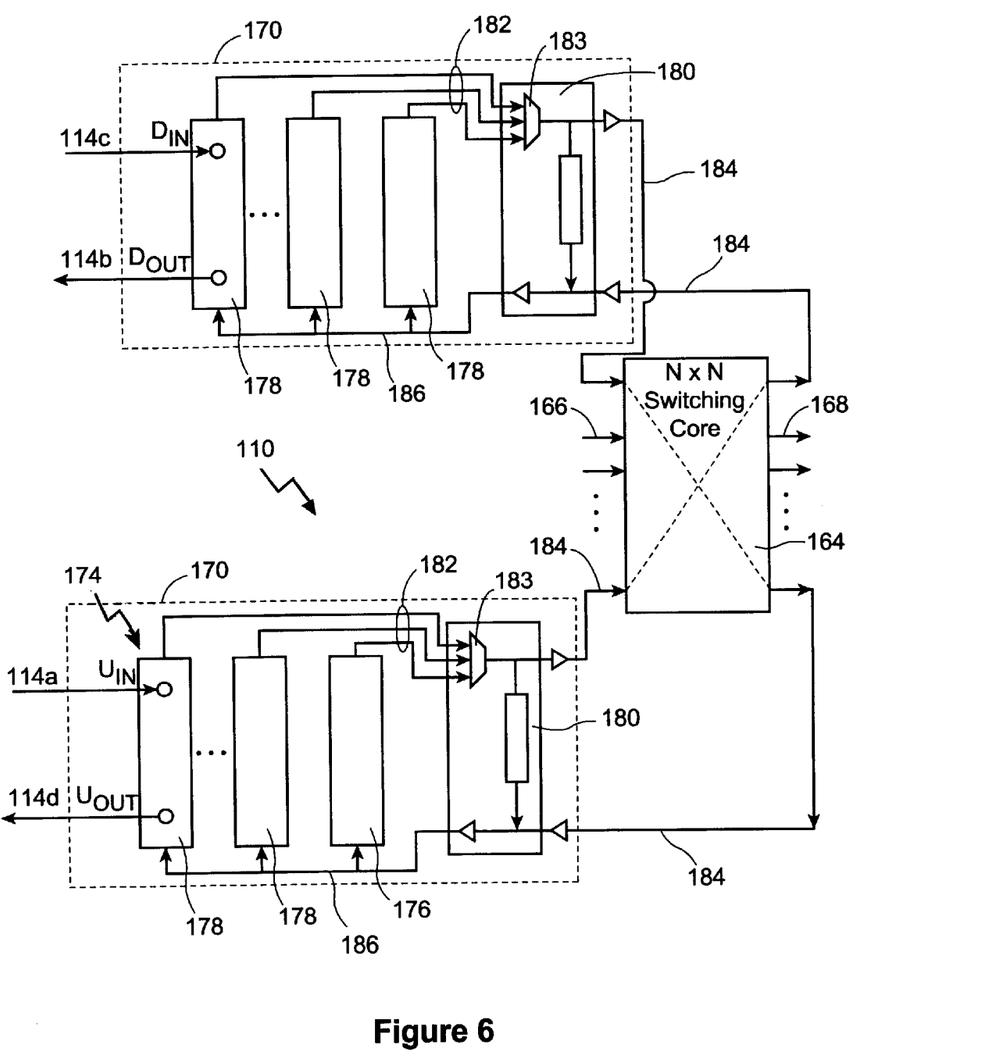
FIG. 6 is a simplified block diagram of an ATM switch within which embodiments of the present invention may be implemented.

The present invention may be implemented at network entities located along the path of an ABR end-to-end connection, for instance at an ATM switch. With reference to FIG. 6, one such switch is the 36170 MainStreetXpress (TM) network switch 110, available from Newbridge Networks Corporation of Kanata, Ontario. The switch 110 comprises a switching fabric which includes a high capacity cell space switching core 164 having N inputs 166, any of which can be switched to one or more of N outputs 168. Switch 110 further comprises one or more access or peripheral shelves 170 (two such shelves 170 being shown). Each peripheral shelf 170 features of a plurality of universal card slots (UCS) for housing user equipment interface cards 174, which cards include input/output ports 114. The interface cards 174 include cards such as system cards which terminate or originate ATM connections and cell relay cards. The cell relay cards may take incoming ATM cells, translate their VPI/VCI values and transport the cells to the switching core 164 so that the cells can be routed to another cell relay card (e.g. an egress card) which in turn transmits the cells to the next network element in the message path.

The peripheral shelf 170 also includes a control card 176, one or more service cards 178 and hub card 180. The hub card 180 multiplexes a plurality of 200 Mb/s "ADD" buses 182 from the various interface cards found on a particular peripheral shelf 170 onto a high-speed 800 Mb/s intershelf link (ISL) bus 184 connecting the shelf 170 with the switching core 164. This is accomplished at multiplexer 183 of the hub card 180. The hub card 180 also terminates the ISL bus 184 from the switching core 164 and drives a multi-drop bus 186 connected to each interface card 174 on shelf 170. In this manner, any interface or system card can communicate with any other interface or system card, irrespective of which peripheral shelves the communicating cards reside with. Further details connecting the architecture of the switch 110 may be found in a variety of documents published by Newbridge Networks Corporation of Kanata, Ontario and in WIPO publication no. WO 95/30318 published Nov. 9, 1995, in respect, of an invention entitled "ATM Switching System" made by Henry Chow et al., which has been assigned to the assignee of the instant application which is incorporated herein by reference.

Preferably, the present invention is implemented in a network switch having the architecture of switch 110 within the interface cards 174 described above. In an ABR end-to-end connection, a service card 178 found on one peripheral shelf 170 may provide upstream inputs and outputs 114a, 114d corresponding to the inputs and outputs 214a, 214d of FIG. 3. Likewise, another service card 178 found on a peripheral shelf 170 may provide downstream inputs and outputs 114b and 114c corresponding to the inputs and outputs 214b and 214c of FIG. 3. Those skilled in this art will appreciate that the present invention may be physically implemented at various locations within the switch 110. For instance, the in-band ER information from arriving backward RM cells at input 114c is extracted and placed in a register 66 (FIG. 3) or the like The register 66 may be physically implemented in the service card which provides input 114c, in the service card which provides output 114d or in the control card 176, to name some examples.

Likewise, local ER information for use with the present invention may be generated from any one or more of a number of contention points within the switch 110. For instance, such contention points (not shown) may include queues associated with inputs 114a or 11c, with outputs 114b or 114d or with multiplexers 183 of hub cards 180. To determine the explicit rate of transmission which is to be marked in each feedback message that is retrieved from the egress queue for the backward direction associated with a network element, the local ER information may be generated in any number of ways. For instance, the local ER information may be derived from a particular single contention point in the network element. Alternatively, the local ER information may be a function of several contention points in the network element. This function may be the average of the ER, values associated with such contention points, by way of example. Preferably, where more than one contention point is utilized to generate local ER information, the local ER value used for marking the backward feedback message is the minimum of the ER values associated with each of the selected contention points. Lastly, in its simplest implementation, the invention may be applied singularly at any queue within a switch, such that extracted in-band ER information from RM cells entering the queue is compared to local ER information derived from a single contention point and the minimum of those two values is marked into RM cells exiting the queue.

The present invention has been described herein by way of example only, and those skilled in this art will readily appreciate that various modifications of detail may be made to the present invention, all of which would come within its spirit and scope.

What is claimed is:

1. A method of feedback control for adjusting a rate of message transmission over a connection in a communications network, the connection comprising a source and a destination of message transmission, a forward message path beginning with the source and ending with the destination, and a backward message path beginning with the destination and ending with the source to form a closed loop for the feedback control, the communications network providing a plurality of network elements through which the forward and the backward message paths each traverse, the source being provided with instructions for setting a rate at which the source will transmit messages over the connection, the instructions being transported over the connection by feedback messages received by the source, each of the feedback messages so received containing an explicit rate of transmission each constituting a lowest of a plurality of explicit rates of transmission which correspond to those determined respectively from states of congestion associated with each of the plurality of network elements, the method of feedback control comprising the steps of:

(a) receiving feedback messages from the backward message path at a network element traversed by the backward message path;

(b) extracting an explicit rate of transmission being carried by each of the feedback messages received;

(c) storing each of the feedback messages received in a first-in first-out order in a queue;

(d) retrieving a feedback message from the head of the queue for transmission from the network element and, substantially at a time when the feedback message retrieved from the head of the queue is to be transmitted externally from the network element, marking the feedback message retrieved from the head of the queue with an explicit rate of transmission determined as a function of an extracted explicit rate pertaining to another feedback message of the feedback messages received more recently received than the feedback message retrieved from the head of the queue and a rate determined from a state of congestion associated with a contention point of the network element; and (e) externally transmitting the feedback message retrieved from the head of the queue from the network element over the backward message path once the feedback message retrieved from the head of the queue has been so marked.

2. The method of feedback control according to claim 1, wherein each of the feedback messages is stored in the queue after extracting the explicit rate of transmission therefrom and the extracted rate pertaining to the another feedback message is stored such that the extracted rate pertaining to a previously received feedback message of the feedback messages received from the backward message path is replaced by that pertaining to the another feedback message.

3. The method of feedback control according to claim 2, wherein the extracted rate pertaining to the another feedback message is stored in a memory register and each of the feedback messages received from the backward message path at the network element are stored in a memory queue, the memory register and memory queue each being provided within the network element.

4. The method of feedback control according to claim 3, wherein the communications network is an Asynchronous Transfer Mode (ATM) network.

5. The method of feedback control according to claim 4, wherein the plurality of network elements comprises a plurality of switches.

6. The method of feedback control according to claim 5, wherein the connection operates according to an Available Bit Rate (ABR) service category.

7. The method of feedback control according to claim 6, wherein the feedback message retrieved from the head of the queue is marked with an explicit rate of transmission which is determined as a function of the explicit rate stored in the memory register and a rate determined from a state of congestion associated with a plurality of contention points of the network element.

8. The method of feedback control according to claim 6, wherein the feedback message retrieved from the head of the queue is marked with an explicit rate of transmission which is determined as a minimum of the explicit rate stored in the memory register and the rate determined from the state of congestion associated with the contention point of the network element.

9. The method of feedback control according to claim 7, wherein the feedback message retrieved from the head of the queue is marked with an explicit rate of transmission which is determined as a minimum of the explicit rate stored in the memory register and the rate determined from the states of congestion associated with the plurality of contention points of the network element, the rate determined from the plurality of states of congestion associated with the plurality of contention points being calculated as a minimum of respective local explicit rate values associated with each of said contention points.

10. A network element for providing feedback control for adjusting a rate of message transmission over a connection in a communications network, the connection comprising a source and a destination of message transmission, a forward message path of the connection beginning with the source and ending with the destination, and a backward message path of the connection beginning with the destination and ending with the source to thereby form a closed loop for said feedback control, the communications network providing a plurality of network elements through which the forward and the backward message paths each traverse, the source being provided with instructions for setting a rate at which the source will transmit messages over the connection, the instructions being transported over the connection by feedback messages received by the source, the feedback messages so received containing an explicit rate of transmission constituting a lowest of a plurality of explicit rates of transmission which correspond to those determined respectively from states of congestion associated with each of the plurality of network elements, the network element comprising:

(a) an input pertaining to the backward message path, wherein the input receives feedback messages from the backward message path;

(b) a first memory associated with the input of the backward message path storing the explicit rate of transmission extracted from each of the feedback messages received from the backward message path;

(c) a second memory, wherein each of the feedback messages received from the backward message path is stored in said second memory in a first-in first-out order after the explicit rate of transmission is extracted therefrom;

(d) an output module pertaining to the backward message path transmitting feedback messages retrieved from said second memory; and wherein a feedback message received is retrieved from the second memory in a first-in first-out order and is thereafter marked with an explicit rate of transmission determined as a function of the explicit rate stored in the first memory pertaining to another feedback message of the feedback messages received different from the feedback message retrieved and a rate determined from a state of congestion associated with a contention point of the network element, the feedback message retrieved being transmitted from the output once the feedback message for transmission has been so marked.

11. The network element according to claim 10, wherein the first memory is a memory register and the second memory is a memory queue.

12. The network element according to claim 11, wherein the network element is a network switch.

13. The network element according to claim 12, wherein the communications network is an Asynchronous Transfer Mode (ATM) network and the connection operates according to an Available Bit Rate (ABR) service category.

14. The network element according to claim 13, wherein the feedback retrieved is marked with an explicit rate of transmission which is determined as a minimum of the explicit rate stored in the first memory and the rate determined from the state of congestion associated with the contention point of the network switch.

15. The network element according to claim 10, wherein the explicit rate of transmission being carried by each of the feedback messages received from the backward message path is extracted and stored in the first memory such that the rate pertaining to a previously received feedback message of the feedback messages received from the backward message path is replaced by that pertaining to the another feedback message.

16. A method of feedback control for adjusting a rate of message transmission over a connection in a communications network, the connection comprising a source and a destination of message transmission, a forward message path beginning with the source and ending with the destination, and a backward message path beginning with the destination and ending with the source to thereby form a closed loop for said feedback control, the communications network providing a plurality of network elements through which the forward and the backward message paths each traverse, the source being provided with instructions for setting a rate at which the source will transmit messages over the connection, the instructions being transported over the connection by feedback messages received by the source, the feedback messages so received each containing an explicit rate of transmission constituting a lowest of a plurality of explicit rates of transmission which correspond to those determined respectively from states of congestion associated with each of the plurality of network elements, the method of feedback control comprising the steps of:

(a) receiving a new feedback message from the backward message path at a network element traversed by the backward message path;

(b) extracting an explicit rate of transmission being carried by the new feedback message;

(c) providing a feedback message for transmission from the network element at a time after said steps (a) and (b) and prior to providing the new feedback message for transmission from the network element and marking the feedback message for transmission with an explicit rate of transmission determined as a function of the explicit rate extracted from the new feedback message and a rate determined from a state of congestion associated with a contention point of the network element substantially at a time when the feedback message for transmission is to be transmitted externally from the network element; and (d) immediately following the marking of the feedback message for transmission as aforesaid, transmitting the feedback message for transmission externally from the network element over the backward message path.

17. The method of feedback control according to claim 16, wherein the communications network is an Asynchronous Transfer Mode (ATM) network.

18. The method of feedback control according to claim 17, wherein the plurality of network elements comprises a plurality of switches.

19. The method of feedback control according to claim 18, wherein the connection operates according to an Available Bit Rate (ABR) service category.

20. The method of feedback control according to claim 19, wherein the feedback message provided for transmission is marked with an explicit rate of transmission which is determined as a function of the explicit rate extracted from the new feedback message and a rate determined from a state of congestion associated with a plurality of contention points of the network element.

21. The method of feedback control according to claim 19, wherein the feedback message provided for transmission is marked with an explicit rate of transmission which is determined as a minimum of the explicit rate extracted from the new feedback message and the rate determined from the state of congestion associated with the contention point of the network element.

22. The method of feedback control according to claim 20, wherein the feedback message provided for transmission is marked with an explicit rate of transmission which is determined as a minimum of the explicit rate extracted from the new feedback message and the rate determined from the states of congestion associated with the plurality of contention points of the network element, the rate determined from the plurality of states of congestion associated with the plurality of contention points being calculated as a minimum of respective local explicit rate values associated with each of said contention points.

* * * * *